US012798385B2

(12) United States Patent
Hu et al.

(10) Patent No.: US 12,798,385 B2
(45) Date of Patent: Nov. 17, 2026

(54) METHOD FOR AN ELECTRICAL MACHINE

(71) Applicant: VOLVO TRUCK CORPORATION, Gothenburg (SE)

(72) Inventors: Yifei Hu, Gothenburg (SE); Sebastian Hall, Gothenburg (SE); Jonas Ottosson, Gothenburg (SE); Andreas Gillström, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 283 days.

(21) Appl. No.: 18/636,800

(22) Filed: Apr. 16, 2024

(65) Prior Publication Data

US 2024/0351443 A1 Oct. 24, 2024

(30) Foreign Application Priority Data

Apr. 18, 2023 (EP) .................................... 23168578

(51) Int. Cl.
*B60L 3/00* (2019.01)
*G07C 5/08* (2006.01)
*H02P 21/18* (2016.01)
*H02P 21/22* (2016.01)

(52) U.S. Cl.
CPC .......... *B60L 3/0061* (2013.01); *G07C 5/0808* (2013.01); *H02P 21/18* (2016.02); *H02P 21/22* (2016.02)

(58) Field of Classification Search
CPC .. H02P 27/08; H02P 6/16; H02P 21/14; H02P 21/22; H02P 21/18; G07C 5/0808
See application file for complete search history.

(56) References Cited

U.S. PATENT DOCUMENTS 5,532,571 A 7/1996 Masaki et al.
10,309,807 B2 6/2019 Qian
2016/0043676 A1 * 2/2016 Adam .................... H02P 6/182 318/400.02

FOREIGN PATENT DOCUMENTS

EP 2292929 A2 3/2011
EP 2292929 A3 4/2012

OTHER PUBLICATIONS

Extended European Search Report in corresponding European Application No. 23168578.5 dated Sep. 27, 2023 (7 pages).

(Continued)

*Primary Examiner* — Said Bouziane
(74) *Attorney, Agent, or Firm* — Jeffri A. Kaminski; Venable LLP

(57) ABSTRACT

A computer system includes processing circuitry configured to: determine a first average of a measured current load angle of an electrical machine and a first average of a correct current load angle of the electrical machine for a plurality of positive speed values within a positive speed interval, determine a second average of the measured current load angle of the electrical machine and a second average of the correct current load angle of the electrical machine for a plurality of negative speed values within a negative speed interval, determine a resolver offset error of the electrical machine from the first and second average of the measured current load angle, and determine a resolver delay error of the electrical machine from the first and second average of the measured current load angle, from the first and second average of the correct current load angle, and from the rotor speed.

11 Claims, 6 Drawing Sheets

(56) References Cited

OTHER PUBLICATIONS

Chuanqiang Lian et al; "Analysis and compensation of the rotor position offset error and time delay in field-oriented-controlled PMSM drives"; IET (The Institution of Engineering and Technology) Power Electronics Research Article; ISSN 1755-4535; E-First on Apr. 30, 2020; doi: 10.1049/iet-pel.2019.1115; www.ietdl.org; 2020, vol. 13, Issue 9, pp. 1911-1918 (8 pages).

Dongok Kim et al; "A Study on Accurate Initial Rotor Position Offset Detection for a Permanent Magnet Synchronous Motor Under a No-Load Condition"; vol. 9; date of publication May 10, 2021; Digital Object Identifier 10.1109/ACCESS.2021.3078821; pp. 73662-73670 (9 pages).

* cited by examiner

METHOD FOR AN ELECTRICAL MACHINE

TECHNICAL FIELD

The disclosure relates generally to electrical machines. In particular aspects, the disclosure relates to a method for an electrical machine. The disclosure can be applied to stand-alone applications as well as to heavy-duty vehicles, such as trucks, buses, and construction equipment, among other vehicle types. Although the disclosure may be described with respect to a particular vehicle, the disclosure is not restricted to any particular vehicle.

BACKGROUND

The dq frame is a mathematical tool used to simplify the analysis and control of electrical machines, such as electric motors or generators.

The dq frame is a coordinate system that rotates with the rotor of the electrical machine, with the d-axis aligned with the machine's magnetic field and the q-axis 90 degrees ahead of the d-axis. By transforming the three-phase electrical quantities of the machine (i.e. with regards to voltage and current) from the stationary orthogonal frame to the rotating dq frame, it is possible to represent the behavior of the electrical machine as a set of two variables, i.e. the direct-axis (d-axis) and the quadrature-axis (q-axis) components.

The d-axis and the q-axis components may represent any electrical or magnetic quantity (such as current, voltage, or flux) that changes in a three-phase system when the phases are shifted 120 degrees in space and time.

Using the dq frame, it is possible to control the behavior of the electrical machine with regards to speed and torque output by manipulating the d-axis and q-axis components of the voltage and current.

A commonly used way to control electrical machines is called field-oriented control (FOC). FOC involves adjusting the d-axis and q-axis components to control the machine's magnetic field. By adjusting these components in real-time, it is possible to maintain a desired speed or torque output from the machine.

FOC requires the position of the rotor as an input. For this purpose, resolvers may be arranged at the rotor shaft, providing resolver signals indicative of the position of the rotor. Nevertheless, a mechanical resolver offset may exist due to the imbalance of mechanical tolerance during the resolver assembly on the rotor shaft.

Another issue that may be associated with resolvers is related to the analog-to-digital conversion of the resolver signals. One common method when performing the analog-to-digital conversion of the resolver signals is to use delta-sigma modulation, which typically includes an initial encoding of the analog signal using high-frequency delta-sigma modulation, and a subsequent digital filtering to form a high-resolution/low sample-frequency digital output. This conversion technique normally comes with an intrinsic delay called group delay.

The resolver offset, as well as the group delay, will cause errors that will lead to an inaccurate determination of the rotor position, which errors may affect the control and efficiency of the electrical machine negatively.

Today, there are strategies for dealing with imprecise values of the rotor position. A widely used approach is to calibrate the resolver offset by applying dq-control, in particular by applying direct current control and set the d and q current components to zero. The resolver mechanical offset compensation is then determined, preferably using a PI controller, so that the d-axis voltage is zero.

The limitation of this calibration strategy is that there is only one input to calibrate, i.e. the mechanical offset of the resolver. However, since there is an increasing use of delta-sigma analog-to-digital conversion due to its high resolution and noise mitigation compared to the traditional successive-approximation analog-to-digital conversion, the additional offset caused by the group delay is a factor that also needs to be compensated for.

There is therefore a need for improved methods, especially with regards to efficient calibration of resolver offsets.

SUMMARY

According to a first aspect of the disclosure, a computer system is provided. The computer system comprises processing circuitry configured to determine a first average of a measured current load angle of an electrical machine and a first average of a correct current load angle of the electrical machine for a plurality of positive speed values within a positive speed interval. The processing circuitry is further configured to determine a second average of the measured current load angle of the electrical machine and a second average of the correct current load angle of the electrical machine for a plurality of negative speed values within a negative speed interval. The processing circuitry is further configured to determine a resolver offset error of the electrical machine from the first and second average of the measured current load angle, and to determine a resolver delay error of the electrical machine from the first and second average of the measured current load angle, from the first and second average of the correct current load angle, and from the rotor speed. The first aspect of the disclosure may seek to improve the accuracy of resolver signals. A technical benefit may include calibration of both mechanical offset and the group delay at the same time to a great accuracy.

In some examples, including in at least one preferred example, optionally the processing circuitry is further configured to determine the first average of the measured current load angle based on at least data representing measured three phase currents and data representing measured resolver position. A technical benefit may include the possibility to use easily available current data.

In some examples, including in at least one preferred example, optionally the processing circuitry is further configured to determine the first average of the correct current load angle based on at least data representing a perfectly aligned dq frame with no resolver error. A technical benefit may include facilitated processing of data in order to obtain a required parameter for determining the resolver error.

In some examples, including in at least one preferred example, optionally the processing circuitry is further configured to disconnect the electrical machine from an associated load prior to determining the first and second averages of the measured and correct current load angle. A technical benefit may include substantial simplification of the calculation process. While this particularly beneficial for vehicle applications, where the electrical machine is connected to the wheels, in other applications the electrical machine may be left connected to the load as long as the electrical machine can spin and that measurements of currents and the resolver angle are possible. A connected load introducing some braking torque will still allow the processing circuitry to determine the resolver offset error and the resolver delay error.

In some examples, including in at least one preferred example, optionally the processing circuitry is further configured to accelerate the electrical machine to a maximum speed value of the positive speed interval, and to allow the electrical machine to freewheel to a minimum speed value of the positive speed interval, wherein the processing circuitry is further configured to determine the first average of the measured and correct current load angle during deceleration of the electrical machine from the maximum speed value to the minimum speed value. A technical benefit may include improved robustness of the processing for determining the resolver error.

In some examples, including in at least one preferred example, optionally the processing circuitry is further configured to control the electrical machine in active short circuit mode during deceleration from the maximum speed value to the minimum speed value of the positive speed interval. A technical benefit may include simplification of the calculation process.

In some examples, including in at least one preferred example, optionally the processing circuitry is further configured to accelerate the electrical machine to a maximum speed value of the negative speed interval, and to allow the electrical machine to freewheel to a minimum speed value of the negative speed interval, wherein the processing circuitry is further configured to determine the second average of the measured and correct current load angle during deceleration of the electrical machine from the maximum speed value to the minimum speed value. A technical benefit may include improved robustness of the processing for determining the resolver error.

In some examples, including in at least one preferred example, optionally the processing circuitry is further configured to control the electrical machine in active short circuit mode during deceleration from the maximum speed value to the minimum speed value of the negative speed interval. A technical benefit may include simplification of the calculation process.

In some examples, including in at least one preferred example, optionally the processing circuitry is further configured to determine the first average of the measured current load angle, the second average of the measured current load angle, the first average of the correct current load angle, and/or the second average of the correct current load angle by a recursive method. A technical benefit may include improved accuracy, as noise of the measured currents is effectively reduced.

In some examples, including in at least one preferred example, optionally the processing circuitry is further configured to determine the resolver offset error as $$\theta_{offset} = \frac{\delta_m(n) + \delta_m(-n)}{2} - \pi.$$

A technical benefit may include simplified calculation and processing of parameter data.

In some examples, including in at least one preferred example, optionally the processing circuitry is further configured to determine the resolver delay error as $$\tau_{gd} = \frac{\delta_m(n) - \delta_c(n)}{2\omega_e} + \frac{\delta_m(-n) - \delta_c(-n)}{-2\omega_e},$$

where $\omega_e$ is the electrical speed in rad/s. A technical benefit may include simplified calculation and processing of parameter data.

In some examples, including in at least one preferred example, optionally the processing circuitry is further configured to determine the first average of the measured current load angle based on at least data representing measured three phase currents and data representing measured resolver position; determine the first average of the correct current load angle based on at least data representing a perfectly aligned dq frame with no resolver error; disconnect the electrical machine from an associated load prior to determining the first and second averages of the measured and correct current load angle; accelerate the electrical machine to a maximum speed value of the positive speed interval, and to allow the electrical machine to freewheel to a minimum speed value of the positive speed interval, wherein the processing circuitry is further configured to determine the first average of the measured and correct current load angle during deceleration of the electrical machine from the maximum speed value to the minimum speed value, and control the electrical machine in active short circuit mode during deceleration from the maximum speed value to the minimum speed value of the positive speed interval; to accelerate the electrical machine to a maximum speed value of the negative speed interval, and allow the electrical machine to freewheel to a minimum speed value of the negative speed interval, wherein the processing circuitry is further configured to determine the second average of the measured and correct current load angle during deceleration of the electrical machine from the maximum speed value to the minimum speed value, and control the electrical machine in active short circuit mode during deceleration from the maximum speed value to the minimum speed value of the negative speed interval; to determine the first average of the measured current load angle, the second average of the measured current load angle, the first average of the correct current load angle, and/or the second average of the correct current load angle by a recursive method; to determine the resolver offset error as $$\theta_{offset} = \frac{\delta_m(n) + \delta_m(-n)}{2} - \pi;$$

and determine the resolver delay error as $$\tau_{gd} = \frac{\delta_m(n) - \delta_c(n)}{2\omega_e} + \frac{\delta_m(-n) - \delta_c(-n)}{-2\omega_e}$$

where $\omega_e$ is the electrical speed in rad/s.

According to a second aspect of the disclosure, a vehicle is provided. The vehicle comprises the computer system according to the first aspect.

The second aspect of the disclosure may seek to improve control of vehicle operation. A technical benefit may include a more accurate value of the rotor position during operation of the electrical machine, thereby improving vehicle operation.

In some examples, including in at least one preferred example, optionally the vehicle comprises an electrical machine comprising a resolver and at least one load connected to the electrical machine, wherein the computer system is configured to determine the resolver offset error and the resolver delay error of the resolver of the electrical machine.

According to a third aspect of the disclosure, a computer-implemented method is provided. The computer-implemented method comprises determining, by processing circuitry of a computer system, a first average of a measured current load angle of an electrical machine and a first average of a correct current load angle of the electrical machine for a plurality of positive speed values within a positive speed interval, determining, by the processing circuitry, a second average of the measured current load angle of the electrical machine and a second average of the correct current load angle of the electrical machine for a plurality of negative speed values within a negative speed interval, determining, by the processing circuitry, a resolver offset error of the electrical machine from the first and second average of the measured current load angle, and determining, by the processing circuitry, a resolver delay error of the electrical machine from the first and second average of the measured current load angle, from the first and second average of the correct current load angle, and from the rotor speed.

In some examples, including in at least one preferred example, optionally the method further comprises disconnecting, by the processing circuitry, the electrical machine from an associated load prior to determining the first and second averages of the measured and correct current load angle. A technical benefit may include that the electrical machine is allowed to rotate freely, thereby simplifying the method.

In some examples, including in at least one preferred example, optionally the method further comprises controlling, by the processing circuitry, the electrical machine in active short circuit mode during deceleration from a maximum speed value to a minimum speed value of the positive speed interval and of the negative speed interval. A technical benefit may include further simplification of the calculation and processing.

In some examples, including in at least one preferred example, optionally the method further comprises calibrating, by the processing circuitry, the resolver position based on the resolver offset error and the resolver delay error.

According to a fourth aspect of the disclosure, a computer program product is provided. The computer program product comprises program code for performing, when executed by the processing circuitry, the method of the third aspect.

According to a fifth aspect of the disclosure, a non-transitory computer-readable storage medium is provided. The non-transitory computer-readable storage medium comprises instructions, which when executed by the processing circuitry, cause the processing circuitry to perform the method of the third aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

Figure 1:
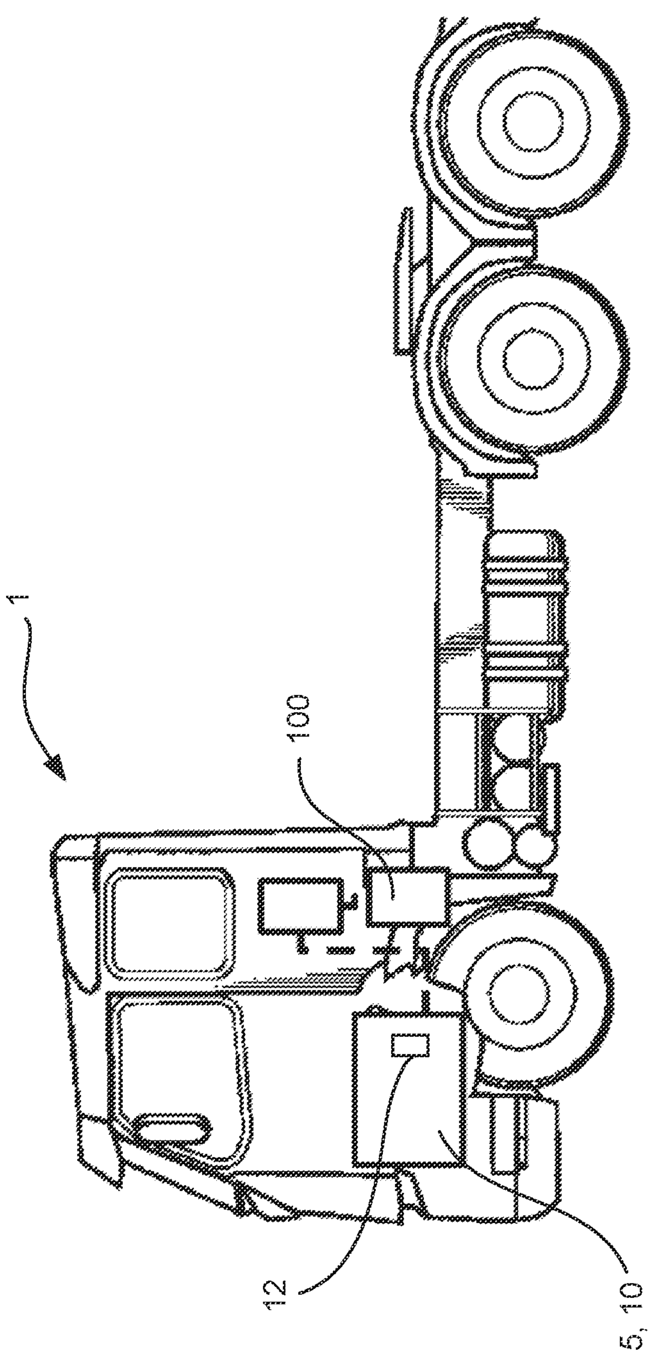
FIG. 1 is a side view of a vehicle comprising a computer system according to an example.

FIG. 1 is an exemplary system diagram of a vehicle 1 according to an example. The vehicle 1 may be any type of vehicle, such as a heavy duty vehicle or a light duty vehicle. The vehicle 1 comprises an electrical machine arrangement 5. The electrical machine arrangement 5 comprises an electrical machine 10 being provided with a resolver 12, and a computer system 100 being configured to determine a resolver offset error and a resolver delay error of the electrical machine 10 as will be further explained in the following. In FIG. 1, the electrical machine arrangement 5 and its included components are shown schematically.

It should be emphasized that the computer system 100 described herein is not exclusively designed to operate with a vehicle 1, but the computer system 100 may be used in any suitable application, such as moving or stationary applications, embedded or stand-alone applications, etc., as long as it is connected to an electrical machine 10 and forms part of an electrical machine arrangement 5.

Figure 2:
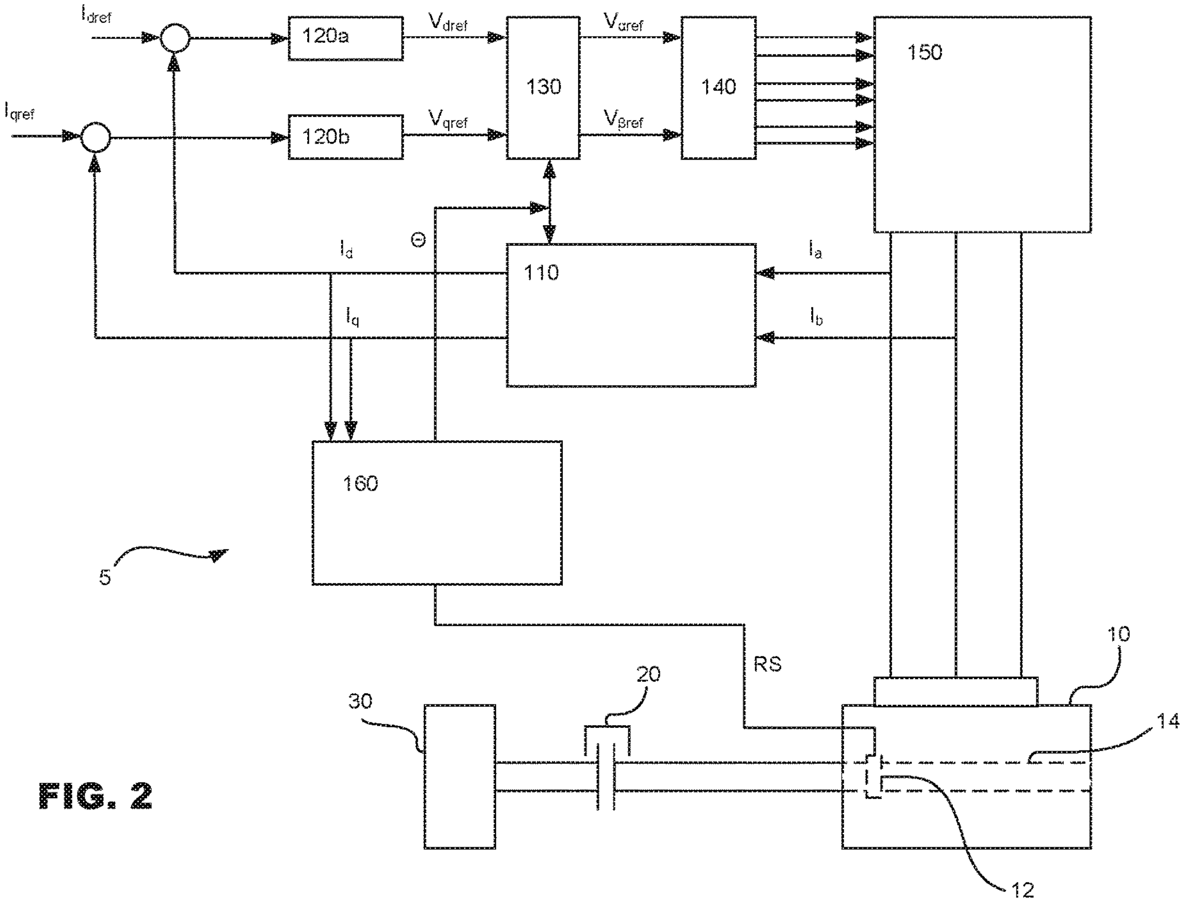
FIG. 2 is an exemplary system diagram of a computer system according to an example.

FIG. 2 is an exemplary system diagram of an electrical machine arrangement 5. The electrical machine arrangement 5 comprises an electrical machine 10. The electrical machine 10 is provided with a resolver 12 configured to transmit a resolver signal RS being indicative of the current position of a rotor 14 of the electrical machine 10.

The electrical machine arrangement 5 further comprises a computer system 100. The computer system 100 is programmed to determine the resolver offset error and the resolver delay error of the resolver 12. The computer system 100 is further configured to allow field-oriented control (FOC) of the electrical machine 10. The computer system 100 comprises a transformation circuitry 110 configured to measure and transform the motor phase currents to the dq frame, resulting in measured dq frame currents $I_d$ and $I_q$. These transformed currents $I_d$ and $I_q$ are compared to reference currents $I_{dref}$ and $I_{qref}$ (i.e. the flux reference and the torque reference) by regulators 120*a*, 120*b*, outputting reference voltages $V_{dref}$ and $V_{qref}$ in the dq frame. An inverse transformation circuitry 130 is configured to invert the reference voltages $V_{dref}$ and $V_{qref}$ to the voltage components $V_{\alpha ref}$ and $V_{\beta ref}$ of the stator vector voltage in the stationary orthogonal reference frame. These reference voltages are inputs to a space vector pulse-width modulator 140 which is configured to provide drive signals to an inverter 150.

Each of the transformation circuitry 110 and the inverse transformation circuitry 130 requires the rotor flux position 0. While the rotor flux position can be provided by the resolver 12, any built-in error in the resolver 12 will cause control errors which may affect operation of the electrical machine 10 negatively.

For this purpose, the computer system 100 is configured to determine these built-in errors of the resolver 12 according to a general principle which will be further explained in the following.

The electrical machine arrangement 5 comprises a disconnect clutch 20 which is arranged to allow disconnection of the electrical machine 10 from any load 30 connected to it. In a vehicle application, such load may typically be a wheel, a speed reducer, or a differential mechanism.

The computer system 100 is configured to control disconnection of the disconnect clutch 20 such that the electrical machine 10 can rotate freely without driving any load 30.

The computer system 100 comprises computing circuitry 160 being configured to determine the resolver offset error and the resolver delay error according to a method 200 generally described with reference to FIG. 3.

It should be noted that the computing circuitry 160, as well as any processing circuitry programmed to perform the method 200, could be implemented as embedded software and/or hardware with a computer system 100 configured to control the operation of the electrical machine 10. However, the computing circuitry 160, as well as any processing circuitry programmed to perform the method 200, could in other examples be implemented as a stand-alone application. Hence, calculation of the built-in errors of the resolver 12 could be performed as part of the normal operation control of the electrical machine 10, or for example only once during production, preferably at the end of line.

Figure 3:
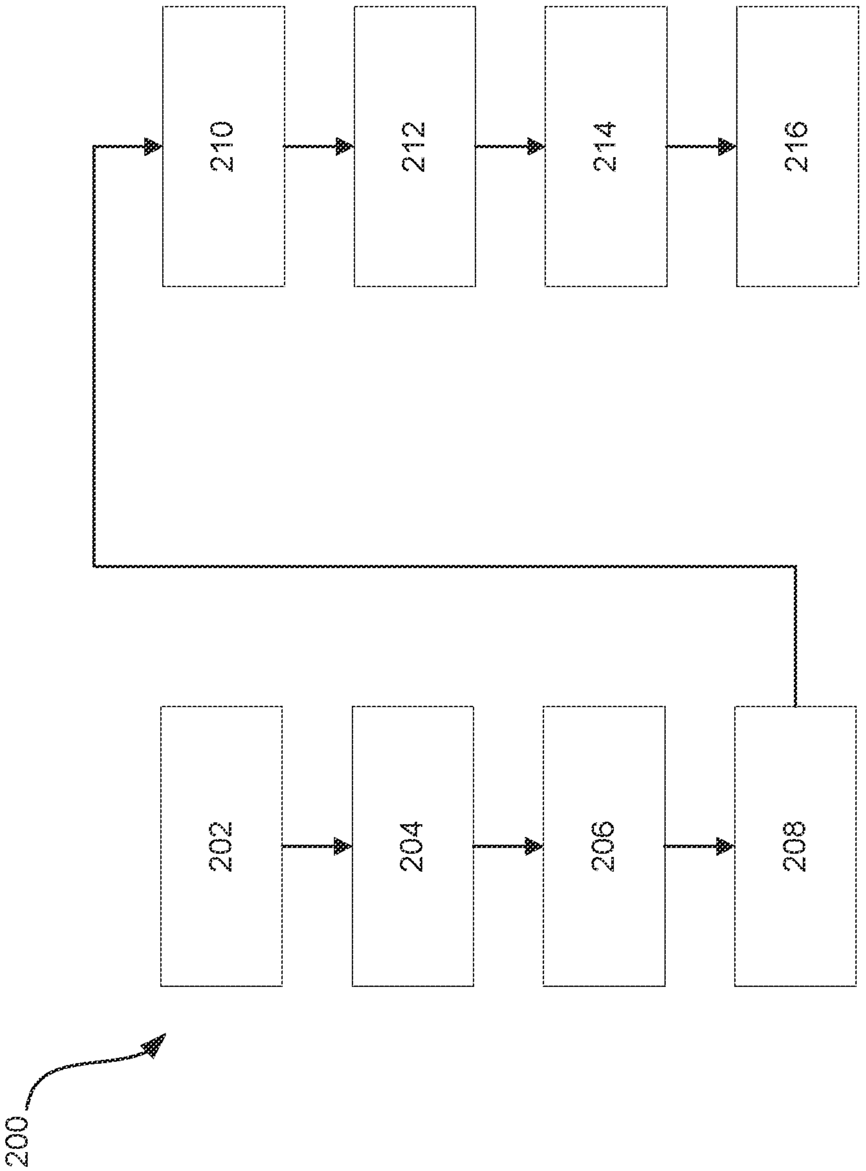
FIG. 3 is flow chart of an exemplary method to determine resolver errors according to an example.

As shown in FIG. 3, the method 200 operates by an initial control 202 of the disconnect clutch 20 to a disconnected state. The method 200 is then applying 204 FOC to the electrical machine 10, such as speed control or torque control, such that the electrical machine 10 is accelerated to a pre-set high speed value, such as 10000 rpm. It should be noted that in some examples the electrical machine 10 is not used for accelerating, but another machine may be used as well. The other machine may be an electrical machine of the same vehicle 1, or an external rig machine.

When the electrical machine 10 has reached is target speed the electrical machine 10 is controlled 206 in active short circuit mode. Due to the braking torque, friction, and losses the electrical machine 10 will start to decelerate 208 from the target speed.

During deceleration from an upper speed to a lower speed, i.e. during a speed interval, the method 200 determines 210 a first average of a measured current load angle $\delta_m(n)$ of an electrical machine 10 and a first average of a correct current load angle $\delta_c(n)$ of the electrical machine 10. The speed interval may e.g. be from 8000 rpm to 6000 rpm.

The measured current load angle $\delta_m(n)$ of the electrical machine 10 is determined as:

$$\delta_m(n) = \tan^{-1}\left(\frac{i_{qm}(n)}{i_{dm}(n)}\right)$$

$\delta_m(n)$ is the current load angle from the measured currents at speed n, $i_{dm}(n)$ and $i_{qm}(n)$ are the d, q-axis currents at speed n transformed from the measured three phase currents and the resolver angle demodulated from the measured sine and cosine resolver signals.

The correct current load angle $\delta_c(n)$ of the electrical machine 10 is determined as:

$$\delta_c(n) = \tan^{-1}\left(\frac{i_{qc}(n)}{i_{dc}(n)}\right)$$

$\delta_c(n)$ is the current load angle from the correct currents at speed n, $i_{dc}(n)$ and $i_{qc}(n)$ are the correct d, q-axis currents at speed n.

The following voltage equations are applied to calculate the correct d, q-axis currents $i_{dc}(n)$ and $i_{qc}(n)$.

$$u_d = R_s i_d + \frac{d\psi_d}{dt} - \omega_e L_q i_q$$

$$u_q = R_s i_q + \frac{d\psi_q}{dt} + \omega_e L_d i_d + \omega_e \psi_{PM}$$

$u_d$ and $u_q$ are the d, q-axis voltages, $R_s$ is the stator resistance, $\psi_d$ and $\psi_q$ are the d, q-axis flux, $L_d$ and $L_q$ are the d, q-axis inductance, WPM is the permanent magnet flux and $\omega_e$ is the electrical speed in rad/s. Therefore, when looking at the steady state when active short circuit mode is turned on, $$\frac{d\psi_d}{dt}, \frac{d\psi_q}{dt},$$

$u_d$ and $u_q$ are all 0. The voltage equations above thus become:

$$0 = R_s i_d - \omega_e L_q i_q$$

$$0 = R_s i_q + \omega_e L_d i_d + \omega_e \psi_{PM}$$

By combing the two equations, the correct d, q-axis currents $i_{dc}$, $i_{qc}$ are acquired as a function of electrical speed shown below:

$$i_{dc} = -\frac{L_q \psi_{PM}}{\frac{R_s^2}{\omega_e^2} + L_d L_q}$$

$$i_{qc} = -\frac{\omega_e \psi_{PM}}{R_s + \frac{\omega_e^2 L_d L_q}{R_s}}$$

So far both the measured current load angle $\delta_m$ and the correct current load angle $\delta_c$ are obtained with respect to each mechanical speed n or electrical speed we. Since the resolver mechanical offset and the group delay contribute the same to the shift of the current load angle and that of the resolver position, it follows that:

$$\delta_m(n) - \delta_c(n) = \theta_m(n) - \theta_c(n) = \theta_{offset} + \omega_e \tau_{gd}$$

$\theta_m(n)$ and $\theta_c$ (n) are the measured rotor position angle and the correct rotor position angle at n rpm, respectively. $\theta_{offset}$ is the mechanical offset, i.e. the resolver offset error, and $\tau_{gd}$ is the group delay, i.e. the resolver delay error. Therefore, with knowing the characteristics of the electrical machine 10, the measured phase currents and the measured resolver angle, the sum of mechanical offset and group delay can be calculated at each speed. This sum is a constant so theoretically it is supposed to be the same at all speeds. However, due to the fluctuations and noises on the measured signals, the calculated value may differ at different speeds. To solve this problem, multiple measurement values are sampled within a speed range.

The method 200 is further designed to determine 212 a second average of a measured current load angle $\delta_m(n)$ of the electrical machine 10 and a second average of a correct current load angle $\delta_c(n)$ of the electrical machine 10. This determination is performed for a plurality of negative speed values within a negative speed interval, by again accelerating the electrical machine 10 using speed or torque control and applying active short circuit mode. The negative speed interval may e.g. be from −8000 rpm to −6000 rpm. Hence, the negative speed interval is thus extending between a maximum speed value of the negative speed interval to a minimum speed value of the negative speed interval. Any reference to a maximum speed value and/or a minimum speed value is herein made with regards to the absolute value of the speed. It should be noted that in some examples the electrical machine 10 is not used for accelerating, but another machine may be used as well. The other machine may be an electrical machine of the same vehicle 1, or an external rig machine.

Applying the negative speed but with the same absolute values, it follows that:

$$\delta_m(-n) - \delta_c(-n) = \theta_m(-n) - \theta_c(-n) = \theta_{offset} - \omega_e \tau_{gd}$$

By adding the above equations, it is possible to cancel $\omega_e \tau_{gd}$ in order to formulate the following equation:

$$\theta_{offset} = \frac{\delta_m(n) + \delta_m(-n)}{2} - \frac{\delta_c(n) + \delta_c(-n)}{2}$$

Based on the above equations it follows that $$\frac{\delta_c(n) + \delta_c(-n)}{2}$$

equals to $\pi$, so it can be derived that:

$$\theta_{offset} = \frac{\delta_m(n) + \delta_m(-n)}{2} - \pi$$

Consequently, the resolver delay error can be formulated as:

$$\tau_{gd} = \frac{\delta_m(n) - \delta_c(n)}{2\omega_e} + \frac{\delta_m(-n) - \delta_c(-n)}{-2\omega_e}$$

The method 200 is thus programmed to determine 214 the resolver offset error $\theta_{offset}$, and to determine 216 the resolver delay error $\tau_{gd}$.

When these parameters are known, it is possible to obtain a more accurate value of the rotor position, thereby improving control of the electrical machine 10.

To further optimize the algorithm and save the memory, the method 200 may be performed as a recursive method, at least the parts required to calculate the average value.

Figure 4:
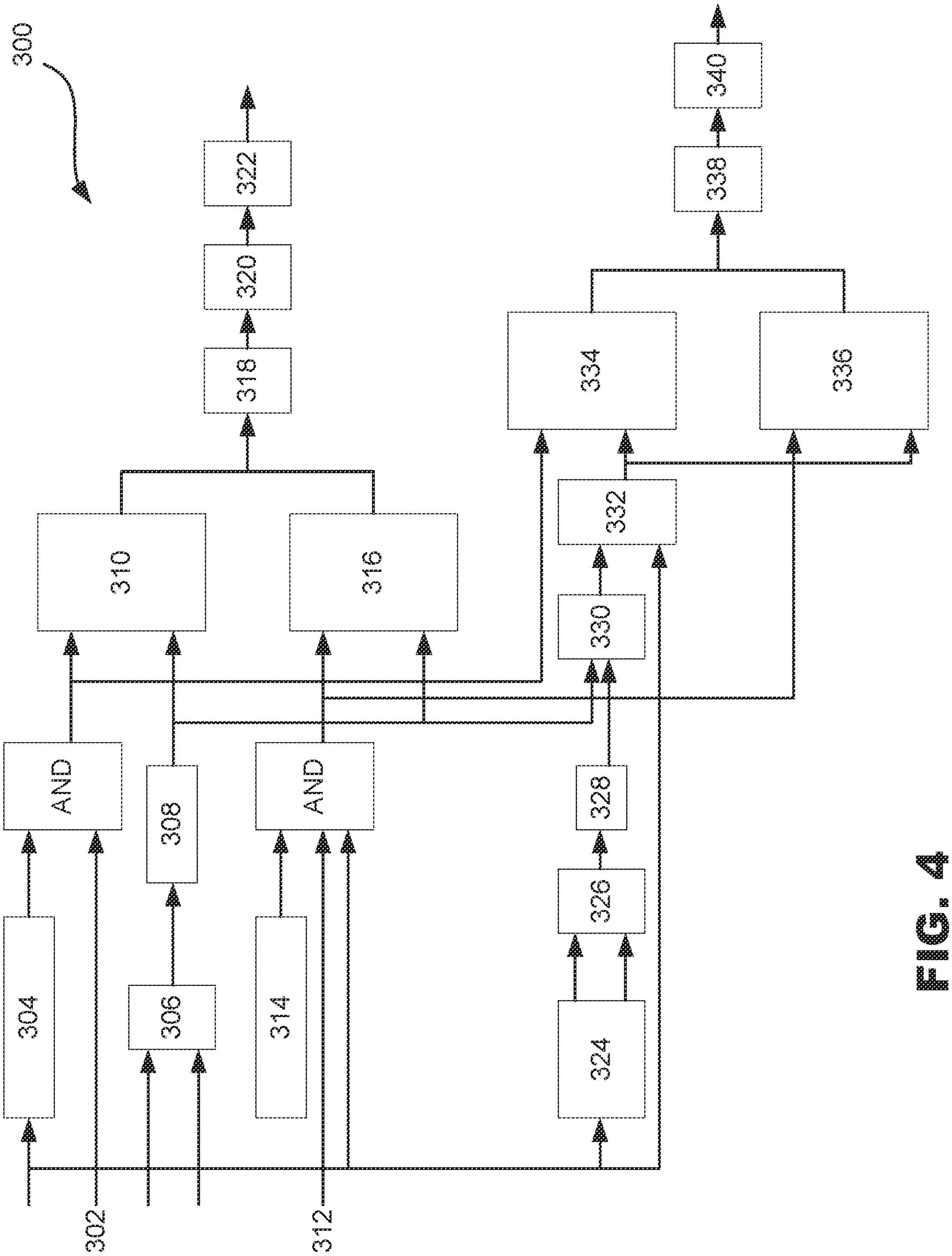
FIG. 4 is a flow chart of an exemplary method to determine resolver errors according to an example.

FIG. 4 shows an example of a logical diagram 300 of the method 200 when performed with an electrical machine 10. During active short circuit 302 and deceleration within a positive speed interval 304, e.g. from 8000 rpm to 6000 rpm, the measured currents $i_{dm}(n)$ and $i_{qm}(n)$ are input to an arctan function 306. Due to periodicity, these values are a modulus $2\pi$ function 308. The measured current load angle $\delta_m(n)$, i.e. the output of logical operators 306 and 308, and the rotational speed are input to a first recursive average calculation 310 to determine the measured current load angle $\delta_m(n)$.

The same procedure is repeated for active short circuit 312 and deceleration within a negative speed interval 314, e.g. from −8000 rpm to −6000 rpm. The measured current load angle $\delta_m(n)$, i.e. the output of logical operators 306 and 308, is also input to a second recursive average calculation 316 together with the negative rotational speed.

The output from the first and second recursive average calculations 310, 316 is input to a sum operator 318, a "divide by 2" operator 320, and to a "minus x" operator 322. The result is the resolver offset error $\theta_{offset}$.

The correct current load angle $\delta_m(n)$ is determined by an operator 324 determining the correct d and q currents $i_{dc}(n)$ and $i_{qc}(n)$ during the positive speed interval 304. The correct currents $i_{dc}(n)$ and $i_{qc}(n)$ are input to an arctan function 326. Due to periodicity, these values are a modulus $2\pi$ function 328. The correct current load angle $\delta_c(n)$, i.e. the output of logical operators 326 and 328, is subtracted from the measured current load angle $\delta_m(n)$ by a "minus" operator 330, and thereafter divided by the rotation speed by a "division" operator 332. The output of operator 332 is input to a third recursive average calculation 334 together with the positive rotational speed, and to a fourth recursive average calculation 336 together with the negative rotational speed.

The outputs from the third and fourth recursive average calculations 334 and 336 are input to a sum operator 338 and to a "divide by 2" operator 340. The result is the resolver delay error $\tau_{gd}$.

Figure 5:
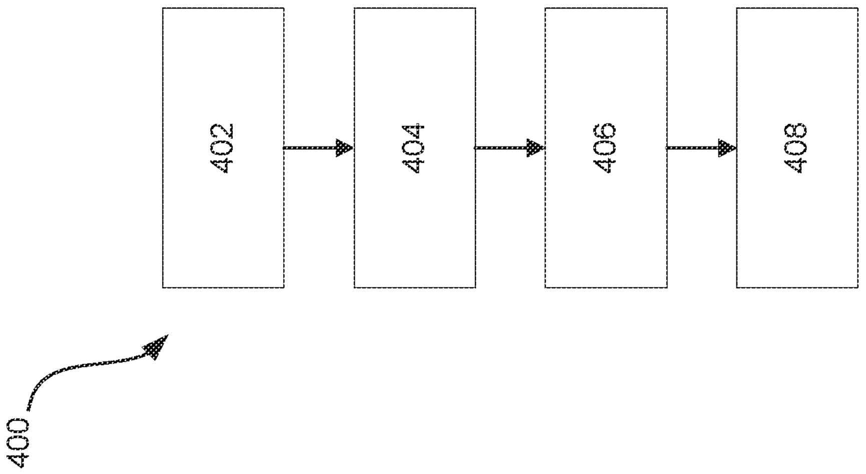
FIG. 5 is another view of FIG. 2, according to an example.

FIG. 5 is a flow chart of a method 400 to determine resolver errors according to an example. The method is configured to determine 402 a first average of a measured current load angle $\delta_m(n)$ of an electrical machine 10 and a first average of a correct current load angle $\delta_c$ (n) of the electrical machine 10 for a plurality of positive speed values within a positive speed interval. The method 400 is further configured to determine 404 a second average of the measured current load angle $\delta_m(n)$ of the electrical machine 10 and a second average of the correct current load angle $\delta_c(n)$ of the electrical machine 10 for a plurality of negative speed values within a negative speed interval.

The method 400 is further configured to determine 406 a resolver offset error $\theta_{offset}$ of the electrical machine 10 from the first and second average of the measured current load angle $\delta_m(n)$.

The method 400 is also configured to determine 408 a resolver delay error $\tau_{gd}$ of the electrical machine 10 from the first and second average of the measured current load angle $\delta_m(n)$, from the first and second average of the correct current load angle $\delta_c(n)$, and from the rotor speed w (n).

To control a 440 Nm/230 KW electrical machine 10, for instance, the speed range of 6000 rpm to 8000 rpm to calculate the current load angle with may be chosen. Normally, under this range the torque is low and not changing fast which leads to a relatively stable deceleration of the machine when the active short circuit is activated. As a result, no further noticeable delay is introduced with the help of a 3rd order angel tracking observer (ATO). On the other hand, at too high-speed range, e.g., around 10000 rpm, the q-axis current lands around OA, the noises on which will generate a relatively larger error on the current load angle calculation. Therefore, 6000 rpm to 8000 has been chosen as the optimal speed range for this purpose.

Experiments have been made, indicating that the resolver offset error for a 4 pole pair electrical machine 10 may be determined to be around 5.5e-8 electrical degrees while the of the resolver delay error may be determined to be around 3.2e-4 microseconds.

Figure 6:
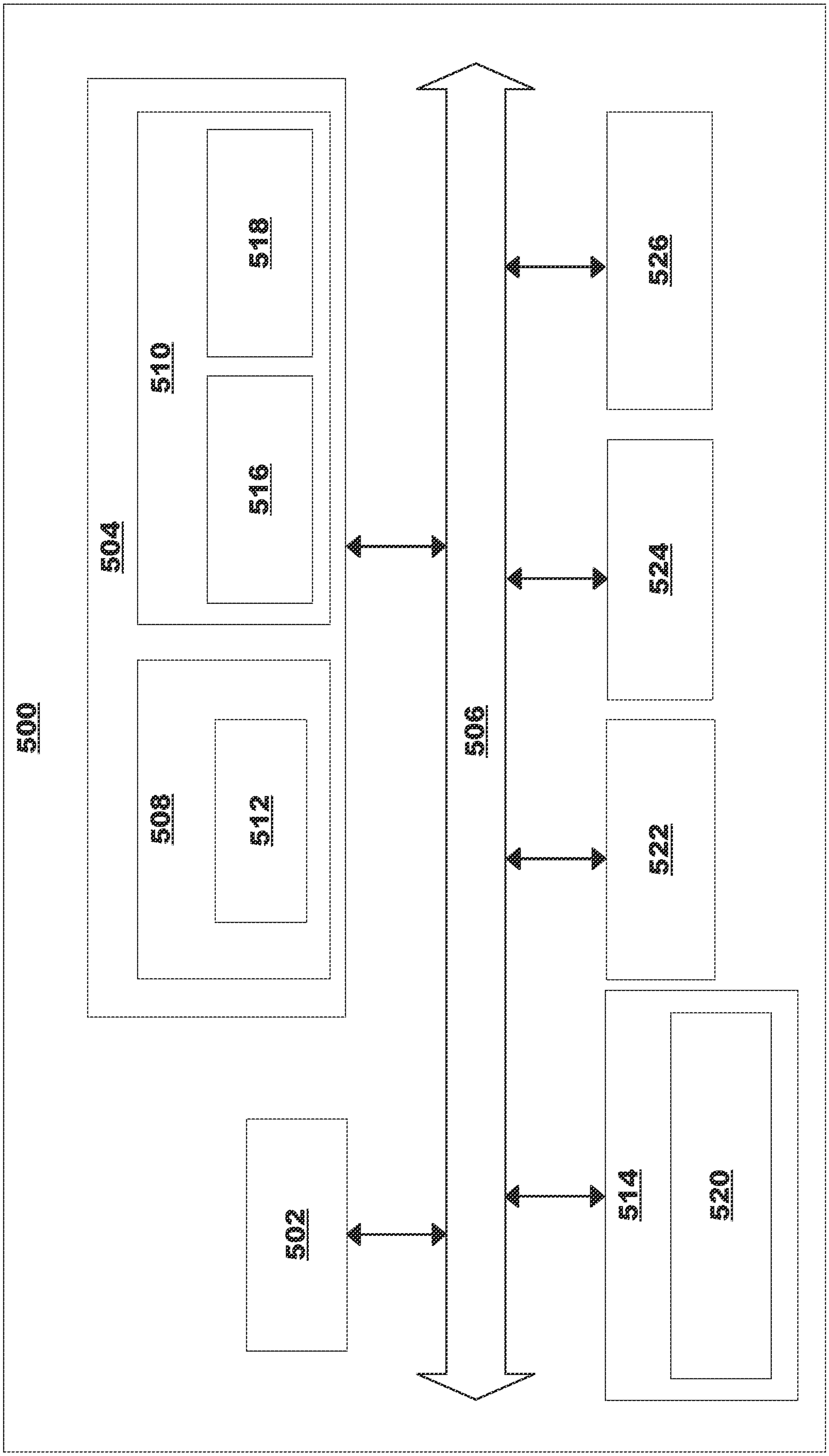
FIG. 6 is a schematic diagram of an exemplary computer system for implementing examples disclosed herein, according to an example.

FIG. 6 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system (100, 500) comprising processing circuitry (502) configured to: determine (210) a first average of a measured current load angle ($\delta_m$(n)) of an electrical machine (10) and a first average of a correct current load angle ($\delta_c$(n)) of the electrical machine (10) for a plurality of positive speed values within a positive speed interval, determine (212) a second average of the measured current load angle ($\delta_m$(n)) of the electrical machine (10) and a second average of the correct current load angle ($\delta_c$(n)) of the electrical machine (10) for a plurality of negative speed values within a negative speed interval, determine (214) a resolver offset error ($\theta_{offset}$) of the electrical machine (10) from the first and second average of the measured current load angle ($\delta_m$(n)), and determine (216) a resolver delay error ($\tau_{gd}$) of the electrical machine (10) from the first and second average of the measured current load angle ($\delta_m$(n)), from the first and second average of the correct current load angle ($\delta_c$(n)), and from the rotor speed ($\omega_e$).

Example 2: The computer system of Example 1, wherein the processing circuitry (502) is further configured to: determine (210) the first average of the measured current load angle ($\delta_m$(n)) based on at least data representing measured three phase currents ($I_a$, $I_b$) and data representing measured resolver position.

Example 3: The computer system of Example 1 or 2, wherein the processing circuitry (502) is further configured to: determine (210) the first average of the correct current load angle ($\delta_c$(n)) based on at least data representing a perfectly aligned dq frame with no resolver error.

Example 4: The computer system of any of Examples 1-3, wherein the processing circuitry (502) is further configured to: disconnect the electrical machine (10) from an associated load (30) prior to determining the first and second averages of the measured and correct current load angle ($\delta_m$(n), $\delta_c$(n)).

Example 5: The computer system of any of Examples 1-4, wherein the processing circuitry (502) is further configured to: accelerate the electrical machine (10) to a maximum speed value of the positive speed interval, and allow the electrical machine (10) to freewheel to a minimum speed value of the positive speed interval, wherein the processing circuitry (502) is further configured to: determine the first average of the measured and correct current load angle ($\delta_m$(n), $\delta_c$(n)) during deceleration of the electrical machine (10) from the maximum speed value to the minimum speed value.

Example 6: The computer system of Example 5, wherein the processing circuitry (502) is further configured to: control the electrical machine (10) in active short circuit mode during deceleration from the maximum speed value to the minimum speed value of the positive speed interval.

Example 7: The computer system of any of Examples 1-6, wherein the processing circuitry is further configured to: accelerate the electrical machine (10) to a maximum speed value of the negative speed interval, and allow the electrical machine (10) to freewheel to a minimum speed value of the negative speed interval, wherein the processing circuitry (502) is further configured to: determine the second average of the measured and correct current load angle ($\delta_m$(n), $\delta_c$ (n)) during deceleration of the electrical machine (10) from the maximum speed value to the minimum speed value.

Example 8: The computer system of Example 7, wherein the processing circuitry (502) is further configured to: control the electrical machine (10) in active short circuit mode during deceleration from the maximum speed value to the minimum speed value of the negative speed interval.

Example 9: The computer system of any of Examples 1-8, wherein the processing circuitry (502) is further configured to: determine the first average of the measured current load angle ($\delta_m$(n)), the second average of the measured current load angle ($\delta_m$ (n)), the first average of the correct current load angle ($\delta_c$(n)), and/or the second average of the correct current load angle ($\delta_c$(n)) by a recursive method.

Example 10: The computer system of any of Examples 1-9, wherein the processing circuitry (502) is further configured to determine the resolver offset error as $$\theta_{offset} = \frac{\delta_m(n) + \delta_m(-n)}{2} - \pi.$$

Example 11: The computer system of any of Examples 1-10, wherein the processing circuitry (502) is further configured to determine the resolver delay error as:

$$\tau_{gd} = \frac{\delta_m(n) - \delta_c(n)}{2\omega_e} + \frac{\delta_m(-n) - \delta_c(-n)}{-2\omega_e},$$

where $\omega_e$ is the electrical speed in rad/s.

Example 12: The computer system of Example 1, wherein the processing circuitry (502) is further configured to: determine (210) the first average of the measured current load angle ($\delta_m$(n)) based on at least data representing measured three phase currents ($I_a$, $I_b$) and data representing measured resolver position; determine (212) the first average of the correct current load angle ($\delta_c$(n)) based on at least data representing a perfectly aligned dq frame with no resolver error; disconnect the electrical machine (10) from an associated load (30) prior to determining the first and second averages of the measured and correct current load angle ($\delta_m$ (n), $\delta_c$(n)); accelerate the electrical machine (10) to a maximum speed value of the positive speed interval, and allow the electrical machine (10) to freewheel to a minimum speed value of the positive speed interval, wherein the processing circuitry is further configured to: determine the first average of the measured and correct current load angle ($\delta_m$(n), $\delta_c$(n))

during deceleration of the electrical machine (10) from the maximum speed value to the minimum speed value, and control the electrical machine (10) in active short circuit mode during deceleration from the maximum speed value to the minimum speed value of the positive speed interval; accelerate the electrical machine (10) to a maximum speed value of the negative speed interval, and allow the electrical machine (10) to freewheel to a minimum speed value of the negative speed interval, wherein the processing circuitry is further configured to: determine the second average of the measured and correct current load angle ($\delta_m$(n), $\delta_c$(n)) during deceleration of the electrical machine (10) from the maximum speed value to the minimum speed value, and control the electrical machine (10) in active short circuit mode during deceleration from the maximum speed value to the minimum speed value of the negative speed interval; determine the first average of the measured current load angle ($\delta_m$(n)), the second average of the measured current load angle ($\delta_m$(n)), the first average of the correct current load angle ($\delta_c$(n)), and/or the second average of the correct current load angle ($\delta_c$(n)) by a recursive method; determine (214) the resolver offset error as $$\theta_{offset} = \frac{\delta_m(n) + \delta_m(-n)}{2} - \pi$$

and determine (216) the resolver delay error as $$\tau_{gd} = \frac{\delta_m(n) - \delta_c(n)}{2\omega_e} + \frac{\delta_m(-n) - \delta_c(-n)}{-2\omega_e}$$

where $\omega_e$ is the electrical speed in rad/s.

Example 13: A vehicle (1) comprising the computer system (100, 500) of any of Examples 1-12.

Example 14: The vehicle of Example 13, further comprising: an electrical machine (10) comprising a resolver (12) and at least one load (30) connected to the electrical machine (10), wherein the computer system is configured to determine the resolver offset error ($\theta_{offset}$) and the resolver delay error ($\tau_{gd}$) of the resolver (12) of the electrical machine (10).

Example 15: A computer-implemented method, comprising: determining (210), by processing circuitry of a computer system, a first average of a measured current load angle ($\delta_m$(n)) of an electrical machine (10) and a first average of a correct current load angle ($\delta_c$(n)) of the electrical machine (10) for a plurality of positive speed values within a positive speed interval, determining (212), by the processing circuitry, a second average of the measured current load angle ($\delta_m$ (n)) of the electrical machine (10) and a second average of the correct current load angle ($\delta_c$(n)) of the electrical machine (10) for a plurality of negative speed values within a negative speed interval, determining (214), by the processing circuitry, a resolver offset error (O offset) of the electrical machine (10) from the first and second average of the measured current load angle ($\delta_m$(n)), and determining (216), by the processing circuitry, a resolver delay error ($\tau_{gd}$) of the electrical machine (10) from the first and second average of the measured current load angle ($\delta_m$(n)), from the first and second average of the correct current load angle ($\delta_c$(n)), and from the rotor speed ($\omega_e$).

Example 16: The method of Example 15, further comprising: disconnecting, by the processing circuitry, the electrical machine (10) from an associated load (30) prior to determining the first and second averages of the measured and correct current load angle ($\delta_m$(n), $\delta_c$(n)).

Example 17: The method of any of Examples 15-16, further comprising: controlling, by the processing circuitry, the electrical machine (10) in active short circuit mode during deceleration from a maximum speed value to a minimum speed value of the positive speed interval and of the negative speed interval.

Example 18: The method of any of Examples 15-17, further comprising: calibrating, by the processing circuitry, the resolver position based on the resolver offset error ($\theta_{offset}$) and the resolver delay error ($\tau_{gd}$).

Example 19: A computer program product comprising program code for performing, when executed by the processing circuitry, the method of any of Examples 15-18.

Example 20: A non-transitory computer-readable storage medium comprising instructions, which when executed by the processing circuitry, cause the processing circuitry to perform the method of any of Examples 15-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer system comprising processing circuitry configured to:

determine a first average of a measured current load angle ($\delta_m$(n)) of an electrical machine based on at least data representing measured three phase currents ($I_a$, $I_b$) and data representing measured resolver position, and a first average of a correct current load angle ($\delta_c$(n)) of the electrical machine based on at least data representing a perfectly aligned dq frame with no resolver error for a plurality of positive speed values within a positive speed interval, determine a second average of the measured current load angle ($\delta_m$(n)) of the electrical machine and a second average of the correct current load angle ($\delta_c$(n)) of the electrical machine for a plurality of negative speed values within a negative speed interval, determine a resolver offset error ($\theta_{offset}$) of the electrical machine from the first and second average of the measured current load angle ($\delta_m$(n)), and determine a resolver delay error ($\tau_{gd}$) of the electrical machine from the first and second average of the measured current load angle ($\delta_m$(n)), from the first and second average of the correct current load angle ($\delta_c$(n)), and from the rotor speed ($\omega_e$)

calibrate the resolver position based on the resolver offset error (@ offset) and the resolver delay error ($\tau_{gd}$).

2. The computer system of claim 1, wherein the processing circuitry is further configured to:

disconnect the electrical machine from an associated load prior to determining the first and second averages of the measured and correct current load angle ($\delta_m$(n), $\delta_c$(n)).

3. The computer system of claim 1, wherein the processing circuitry further configured to:

accelerate the electrical machine to a maximum speed value of the positive speed interval, and allow the electrical machine to freewheel to a minimum speed value of the positive speed interval, wherein the processing circuitry is further configured to:

determine the first average of the measured and correct current load angle ($\delta_m$(n), $\delta_c$(n)) during deceleration of the electrical machine from the maximum speed value to the minimum speed value, wherein the processing circuitry is further configured to:

control the electrical machine in an active short circuit mode during deceleration from the maximum speed value to the minimum speed value of the positive speed interval.

4. The computer system of claim 1, wherein the processing circuitry is further configured to:

accelerate the electrical machine to a maximum speed value of the negative speed interval, and allow the electrical machine to freewheel to a minimum speed value of the negative speed interval, wherein the processing circuitry is further configured to:

determine the second average of the measured and correct current load angle ($\delta_m$(n), $\delta_c$(n)) during deceleration of the electrical machine from the maximum speed value to the minimum speed value, wherein the processing circuitry is further configured to:

control the electrical machine in active short circuit mode during deceleration from the maximum speed value to the minimum speed value of the negative speed interval.

5. The computer system of claim 1, wherein the processing circuitry is further configured to:

determine the first average of the measured current load angle ($\delta_m$(n)), the second average of the measured current load angle ($\delta_m$(n)), the first average of the correct current load angle ($\delta_c$(n)), and/or the second average of the correct current load angle ($\delta_c$(n)) by a recursive method.

6. The computer system of claim 1, wherein the processing circuitry is further configured to:

determine the resolver offset error as $$\theta_{offset} = \frac{\delta_m(n) + \delta_m(-n)}{2} - \pi$$

and wherein the processing circuitry is further configured to:

determine the resolver delay error as $$\tau_{gd} = \frac{\delta_m(n) - \delta_c(n)}{2\omega_e} + \frac{\delta_m(-n) - \delta_c(-n)}{-2\omega_e}$$

where $\omega_e$ is the electrical speed in rad/s.

7. The computer system of claim 1, wherein the processing circuitry is further configured to:

determine the first average of the measured current load angle ($\delta_m$(n)) based on at least data representing measured three phase currents ($I_a$, $I_b$) and data representing measured resolver position;

determine the first average of the correct current load angle ($\delta_c$(n)) based on at least data representing a perfectly aligned dq frame with no resolver error;

disconnect the electrical machine from an associated load prior to determining the first and second averages of the measured and correct current load angle ($\delta_m$(n), $\delta_c$(n));

accelerate the electrical machine to a maximum speed value of the positive speed interval, and allow the electrical machine to freewheel to a minimum speed value of the positive speed interval, wherein the processing circuitry is further configured to:

determine the first average of the measured and correct current load angle ($\delta_m$(n), $\delta_c$(n)) during deceleration of the electrical machine from the maximum speed value to the minimum speed value, and control the electrical machine in active short circuit mode during deceleration from the maximum speed value to the minimum speed value of the positive speed interval;

accelerate the electrical machine to a maximum speed value of the negative speed interval, and allow the electrical machine to freewheel to a minimum speed value of the negative speed interval, wherein the processing circuitry is further configured to:

determine the second average of the measured and correct current load angle ($\delta_m$(n), $\delta_c$(n)) during deceleration of the electrical machine from the maximum speed value to the minimum speed value, and control the electrical machine in active short circuit mode during deceleration from the maximum speed value to the minimum speed value of the negative speed interval;

determine the first average of the measured current load angle ($\delta_m(n)$), the second average of the measured current load angle ($\delta_m(n)$), the first average of the correct current load angle ($\delta_c(n)$), and/or the second average of the correct current load angle ($\delta_c(n)$) by a recursive method;

determine the resolver offset error as $$\theta_{offset} = \frac{\delta_m(n) + \delta_m(-n)}{2} - \pi$$

and determine the resolver delay error as $$\tau_{gd} = \frac{\delta_m(n) - \delta_c(n)}{2\omega_e} + \frac{\delta_m(-n) - \delta_c(-n)}{-2\omega_e}$$

where $\omega_e$ is the electrical speed in rad/s.

8. A vehicle comprising the computer system of claim 1.

9. The vehicle of claim 8, further comprising:

an electrical machine comprising a resolver and at least one load connected to the electrical machine, wherein the computer system is configured to determine the resolver offset error ($\theta_{offset}$) and the resolver delay error ($\tau_{gd}$) of the resolver of the electrical machine.

10. A computer-implemented method, comprising:

determining, by a processing circuitry of a computer system, a first average of a measured current load angle ($\delta_m(n)$) of an electrical machine based on at least data representing measured three phase currents ($I_a$, $I_b$) and data representing measured resolver position, and a first average of a correct current load angle ($\delta_c(n)$) of the electrical machine based on at least data representing a perfectly aligned dq frame with no resolver error for a plurality of positive speed values within a positive speed interval, determining, by the processing circuitry, a second average of the measured current load angle ($\delta_m(n)$) of the electrical machine and a second average of the correct current load angle ($\delta_c(n)$) of the electrical machine for a plurality of negative speed values within a negative speed interval, determining, by the processing circuitry, a resolver offset error ($\theta_{offset}$) of the electrical machine from the first and second average of the measured current load angle ($\delta_m(n)$), and determining, by the processing circuitry, a resolver delay error ($\tau_{gd}$) of the electrical machine from the first and second average of the measured current load angle ($\delta_m(n)$), from the first and second average of the correct current load angle ($\delta_c(n)$), and from the rotor speed ($\omega_e$), calibrating, by the processing circuitry, the resolver position based on the resolver offset error ($\theta_{offset}$) and the resolver delay error ($\tau_{gd}$).

11. A non-transitory computer-readable storage medium comprising instructions, which when executed by the processing circuitry, cause the processing circuitry to perform the method of claim 10.

* * * * *